(12) United States Patent
Tanaka

(10) Patent No.: US 11,124,104 B2
(45) Date of Patent: Sep. 21, 2021

(54) DUMP TRUCK

(71) Applicant: Komatsu Ltd., Tokyo (JP)

(72) Inventor: Yushi Tanaka, Tokyo (JP)

(73) Assignee: Komatsu Ltd., Tokyo (JP)

( * ) Notice: Subject to any disclaimer, the term of this patent is extended or adjusted under 35 U.S.C. 154(b) by 668 days.

(21) Appl. No.: 16/072,268

(22) PCT Filed: Mar. 12, 2018

(86) PCT No.: PCT/JP2018/009423
§ 371 (c)(1),
(2) Date: Jul. 24, 2018

(87) PCT Pub. No.: WO2018/151335
PCT Pub. Date: Aug. 23, 2018

(65) Prior Publication Data
US 2021/0206305 A1    Jul. 8, 2021

(51) Int. Cl.
| | | |
|---|---|---|
| *B62D 25/18* | (2006.01) | |
| *B60P 1/04* | (2006.01) | |
| *B60K 11/04* | (2006.01) | |
| *B62D 25/16* | (2006.01) | |
| *B60K 13/02* | (2006.01) | |
| *B60K 13/04* | (2006.01) | |
| *B60K 11/06* | (2006.01) | |

(52) U.S. Cl.
CPC ............... *B60P 1/04* (2013.01); *B60K 11/04* (2013.01); *B60K 11/06* (2013.01); *B60K 13/02* (2013.01); *B60K 13/04* (2013.01); *B62D 25/16* (2013.01); *B62D 25/168* (2013.01)

(58) Field of Classification Search
CPC ....... B62D 25/16; B62D 25/168; B62D 25/18
See application file for complete search history.

(56) References Cited

U.S. PATENT DOCUMENTS

| | | | | |
|---|---|---|---|---|
| 4,706,981 A | * | 11/1987 | Dorwart | B62D 25/168 |
| | | | | 239/290 |
| 9,777,616 B1 | * | 10/2017 | Kanayama | F01P 3/18 |
| 2014/0182963 A1 | | 7/2014 | Sekiya | |
| 2014/0246262 A1 | | 9/2014 | Mori et al. | |
| 2014/0266859 A1 | * | 9/2014 | Kurihara | G01S 13/86 |
| | | | | 342/70 |
| 2017/0284274 A1 | | 10/2017 | Kanayama et al. | |

(Continued)

FOREIGN PATENT DOCUMENTS

| | | |
|---|---|---|
| CA | 2958965 A1 | 2/2018 |
| CN | 203460958 U | 3/2014 |
| CN | 103842593 A | 6/2014 |

(Continued)

*Primary Examiner* — Brian L Swenson
(74) *Attorney, Agent, or Firm* — Locke Lord LLP

(57) ABSTRACT

A dump truck includes an engine provided in an engine compartment, and a pair of fenders provided at a rear side of the engine compartment and provided at a distance in the vehicle width direction. The dump truck includes the fender having a fender inclination plate extending so as to incline downward along a rear portion of each front wheel, and a shield portion having a shield inclination plate inclined downward while directing rearward between the pair of fenders and both ends of which in the vehicle width direction are connected to the respective fenders.

20 Claims, 5 Drawing Sheets

(56) References Cited

U.S. PATENT DOCUMENTS

2018/0247470 A1\* 8/2018 Yui ........................ B60K 35/00
2018/0334193 A1\* 11/2018 Aoyama .............. B62D 25/168

FOREIGN PATENT DOCUMENTS

| CN | 103917395 A | 7/2014 |
|---|---|---|
| CN | 204895111 U | 12/2015 |
| JP | 56-014730 U | 2/1981 |
| JP | 59-029362 U | 2/1984 |
| JP | 60-168625 U | 11/1985 |
| JP | 2004-255956 A | 9/2004 |
| JP | 6208892 B1 | 10/2017 |
| WO | 2016/163300 A1 | 10/2016 |

\* cited by examiner

DUMP TRUCK

TECHNICAL FIELD

The present invention relates to a dump track.

BACKGROUND TECHNOLOGY

In Patent Document 1, a dump truck is described in which an engine in an engine compartment formed under a platform is provided. On the platform of dump truck is an air cleaner, where air is sucked into the engine.

Behind front wheels of dump truck, a fender that extends diagonally rearward from platform is provided. The mud, water, etc., which are repelled by the front wheels, are blocked by the fender.

PRIOR ART DOCUMENT

Patent Document

Patent Document 1, Japanese Patent No. 6208892

BRIEF SUMMARY OF THE INVENTION

Problems to be Solved by the Invention

If the air that is heated when the engine is cooled and directed rearward rises up to the platform, the temperature of the atmosphere on the platform increases. On the platform, a device such as an air cleaner may be disposed, and it is not preferable to be in a high temperature.

On the other hand, if dirt containing moisture is adhered to a fender and accumulated thereon, it may affect in running performance and maintenance.

The present invention is provided in view of the above problems, and one object thereof is to provide a dump truck which is capable of suppressing an accumulation of dirt on a fender while suppressing becoming high temperature on a platform.

Means for Solving the Problem

A dump truck according to an aspect of the present invention includes: a frame including a pair of lateral members extending in forward-rearward directions and disposed at a distance in a vehicle width direction and a vertical member extending upward from each of the lateral members; wheels provided at a distance in the vehicle width direction and connected to the frame; a platform supported on each of the vertical members and partitioning an engine compartment below; an engine provided in the engine compartment; a pair of fenders, each of which has a fender inclination plate extending downward from the platform side toward the rearward side along the rear portion of each of the wheels; and a shield portion having a shield inclination plate that inclines downward from the platform side toward the rearward side between the pair of the fenders, and both ends of which in the vehicle width direction are respectively connected to the fenders.

According to the dump truck of the above configuration, air that is heated by cooling the engine is prevented to rise up by the shield portion extending diagonally rearward from the platform.

Also, since both ends of the shield portion in the vehicle width direction are connected to the respective fenders, the air that reaches the shield portion flows along the shield portion in the vehicle width direction and then is directly guided to the fenders. The fenders can be warmed by the air and it is possible to dry the dirt containing moisture adhered to the fenders. As a result, it is possible to drop the dirt from the fenders.

Effect of Invention

In accordance with the dump truck in the aspect described above, it is possible to reduce the accumulation of dirt on the fender while suppressing a temperature rise of the platform.

BRIEF DESCRIPTION OF DRAWINGS

In FIG. 3, the description of cab is omitted.

EMBODIMENTS FOR CARRYING OUT THE INVENTION

Hereinafter, a dump truck according to a first embodiment of the present invention is described with reference to FIGS. 1 to 5.

Figure 1:
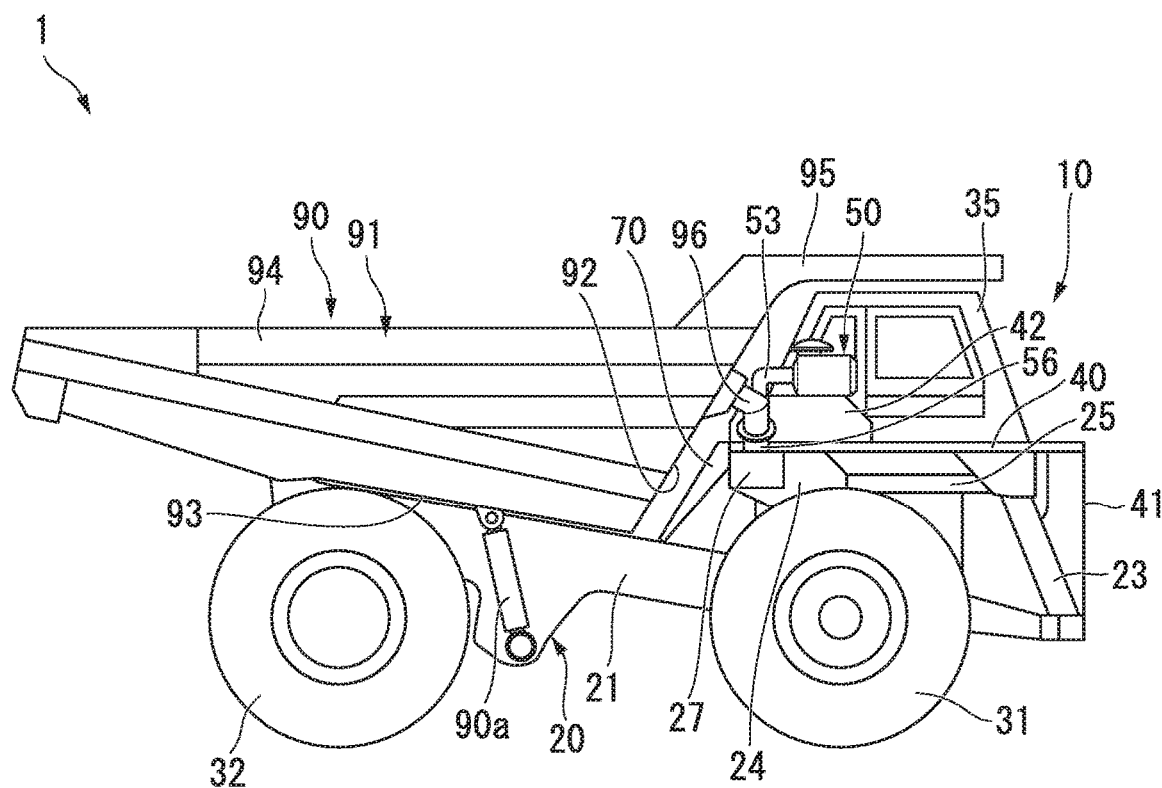
FIG. 1 is a side view of a dump truck according to an embodiment of the present invention.

As shown in FIG. 1, a dump truck 1 includes a chassis 10 and a vessel 90.

In the following, forward and rearward directions, a forward direction, a rearward direction, and a width direction of the chassis 10 may be respectively referred to simply as "forward-rearward directions", "forward", "rearward" and "vehicle width direction". A direction toward a center in the vehicle width direction is referred to as "inward in the vehicle width direction", and a direction from the center in the vehicle width direction to right side or left side may be referred to as "outward in the vehicle width direction".

Also, a vertical direction, an upward direction, and a downward direction of the dump truck 1 when the dump truck 1 is placed on a horizontal surface may be respectively referred to as "vertical direction", "upward", or "downward".

<Chassis>

The chassis 10 has a frame 20, front wheels 31, rear wheels 32, a cab 35, a platform 40, a lower portion cover 43, an upper portion cover 42, an engine 45, an air cleaner 50, an intake pipe 53, an exhaust gas purification device 55, an exhaust pipe 56, a cooling unit 60, a cooling fan 61, a hydraulic device 62, a fender 70, a shield portion 80, and a bracket 85, as shown in FIGS. 1 to 5.

<Frame>

Figure 2:
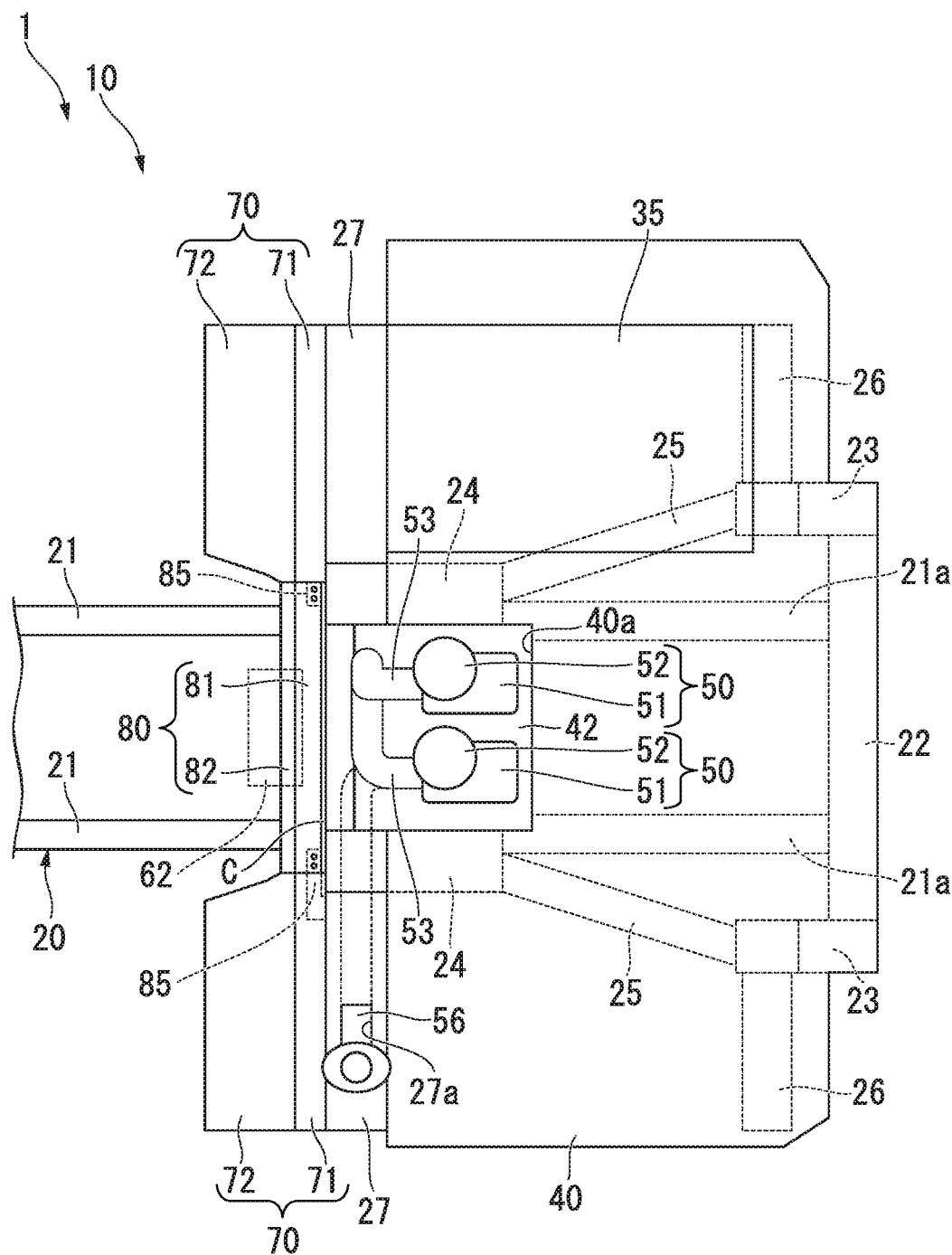
FIG. 2 is a plan view of a front portion of a chassis in the dump truck of the embodiment of the present invention.
Figure 3:
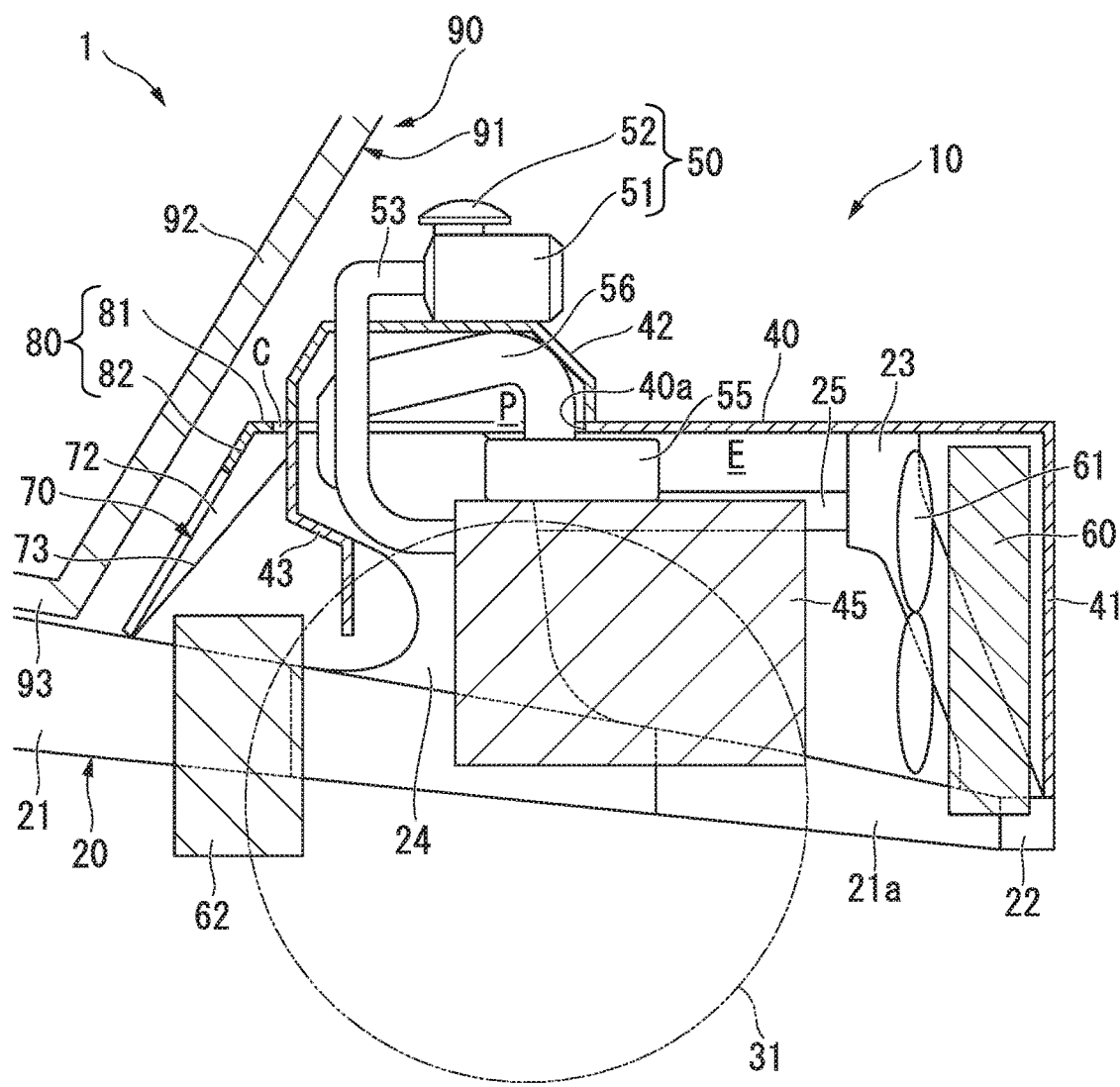
FIG. 3 is a longitudinal cross-sectional view of the front portion of the chassis in the dump truck according to the embodiment of the present invention.

A frame 20 has a lateral member 21, a front lateral member 21a, a bumper 22, a front vertical member 23, a rear vertical member 24, a front-rear stay 25, a front support 26, and a rear support 27, as shown in FIGS. 2 and 3.

<Lateral Member>

A pair of lateral members 21 extends in the forward-rearward directions and is provided so as to be spaced apart to each other in the vehicle width direction. The pair of lateral members 21 is provided in parallel with each other and in the same height positions.

Each lateral member 21 extends so as to incline upward while directing to a rear side of the dump track.

A pair of front lateral members 21a is disposed forward the pair of lateral members 21 at a distance from the pair of lateral members 21. The front lateral members 21a extend in the forward-backward directions.

The bumper 22 extends in the vehicle width direction at the front ends of the pair of front lateral members 21a. The bumper 22 connects the pair of front lateral members 21a in the vehicle width direction. As shown in FIG. 2, both ends of the bumper 22 in the vehicle width direction respectively protrude outward the front lateral members 21a in the vehicle width direction.

<Front Vertical Member>

As shown in FIGS. 2 and 3, a pair of front vertical members 23 is disposed so as to respectively extend upward from the both ends of the bumper 22 in the vehicle width direction. Each front vertical member 23 extends so as to incline rearward while directing upward. An upper end of each front vertical member 23 has a flat shape along a horizontal surface.

<Rear Vertical Member>

A pair of rear vertical members 24 is disposed rearward the front vertical members 23 and each rear vertical member 24 extends upward from between the lateral members 21 and the front lateral members 21a. Both ends in the forward-rearward directions in a lower portion of each rear vertical member 24 are integrally fixed with a front end of the corresponding lateral member 21 and a rear end of the corresponding front lateral member 21a. A rear portion in an upper portion of each rear vertical member 24 has a shape protruding rearward. As a result, each rear vertical member 24 has a longer shape in the forward-rearward directions at an upper portion than a base portion of a lower end. An upper end of each rear vertical member 24 has a flat shape along the horizontal surface. A rear end surface at a protruded portion in the upper portion of each rear vertical member 24 has a flat shape along a vertical surface. The upper end of the rear vertical member 24 is the same position in the vertical direction as the upper end of the front vertical member 23.

<Front Support>

As shown in FIG. 2, a pair of front supports 26 is provided so as to extend outward in the vehicle width direction from the upper portion of each front vertical member 23. The front support 26 is integrally fixed to a lateral surface facing outward the front vertical member 23 in the vehicle width direction by a fixing member such as bolt, for example.

<Rear Support>

Figure 4:
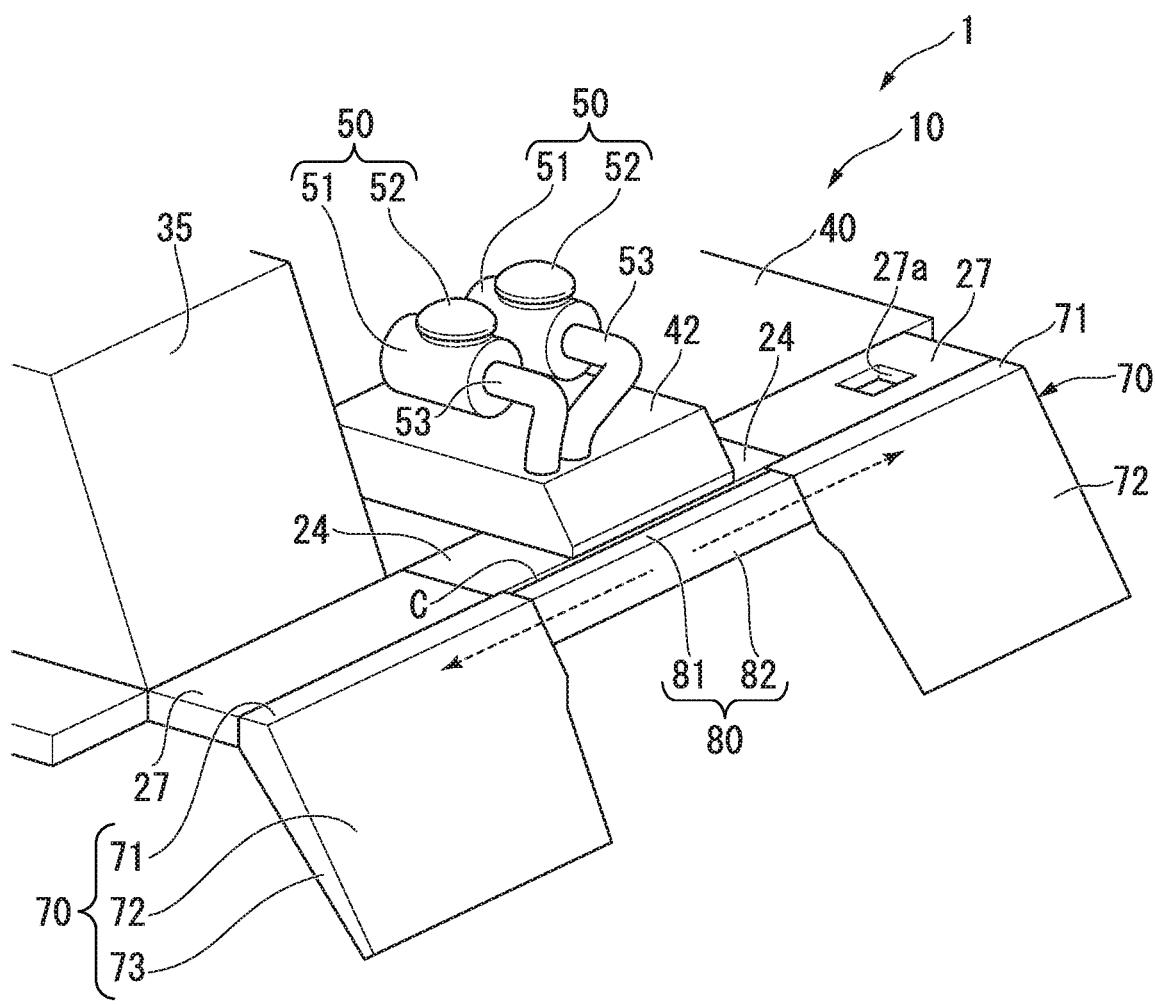
FIG. 4 is a perspective view of the front portion of the chassis in the dump truck according to the embodiment of the present invention.

As shown in FIGS. 2 to 4, a pair of rear supports 27 is disposed so as to extend outward in the vehicle width direction from the upper portion of each rear vertical member 24. Each rear support 27 is integrally fixed to a lateral surface facing the outward the rear vertical member 24 in the vehicle width direction via a fixing member such as bolt, for example. The rear support 27 has a rectangular shape in a cross section perpendicular to the vehicle width direction. An upper end surface of the rear support 27 has a flat shape along the horizontal surface and is a position in the vertical direction corresponding to the upper end of the rear vertical member 24. A rear end surface of the rear support 27 has a flat shape along the vertical surface and is a forward-rearward position corresponding to the rear end surface in the upper portion of the rear vertical member 24.

<Front Wheels and Rear Wheels>

As shown in FIG. 1, a pair of front wheels 31 is provided at both sides of the front portion of the frame 20 in the vehicle width direction. A pair of rear wheels 32 is provided at both sides of the rear portion of the frame 20 in the vehicle width direction. The front wheels 31 and the rear wheels 32 are connected to the frame 20 via a suspension device (not shown). The frame 20 is rotatably supported by the front wheels 31 and the rear wheels 32.

Here, as shown in FIGS. 1 and 3, a position of the front wheels 31 in the forward-rearward directions is a position corresponds to the rear vertical member 24. A rear end of the wheel is positioned on the rearward side of the rear end surface of the upper portion of the rear vertical member 24 and the rear end surface of the rear support 27.

<Cab>

As shown in FIGS. 1 and 2, the cab 35 is provided at a portion in the left side in the vehicle width direction at the forward upper portion of the chassis 10. In the cab 35, a driver seat for an operator of dump truck 1 is provided. In the cab 35, a forward lower portion is supported on the front support 26 in the left side in the vehicle width direction and a rearward lower portion is supported on the rear support 27 in the left side in the vehicle width direction.

<Platform>

As shown in FIGS. 2 and 3, the platform 40 has a plate shape extending along the horizontal surface. The platform 40 is disposed across respective upper ends of the front vertical members 23, the front supports 26, and the rear vertical members 24, and is supported by these upper ends. The platform 40 has a shape in which the vehicle width direction is regarded as a long-side (longitudinal) direction and the forward-rearward directions is regarded as a short-side direction. Both ends of the platform 40 in the vehicle width direction extend in the forward-rearward directions and are positioned outward in the vehicle width direction the both ends in the vehicle width direction of the front supports 26 and the rear supports 27.

The rear portion of the platform 40 is mounted on a part of the forward side of the upper end surface of the pair of rear vertical members 24 and is supported from below. The rear end of the platform 40 extends along the vehicle width direction. As shown in FIG. 4, the rear end of the platform 40 extends along the front end of the rear supports 27.

The platform 40 has a shape partially cutout so as to avoid the cab 35 when viewed from a plan view. A result, in the left side in the vehicle width direction of the cab 35, a path for boarding the cab 35 is formed by an upper surface of the platform 40. In addition, the dump truck 1 is equipped with stairs and ladders (not shown) to climb the platform 40.

In the rear portion at the center in the width direction in the platform 40, a cutout portion 40a is formed in a rectangular shape from the rear end of the platform 40 toward the forward side. The cutout portion 40a is formed in a position corresponding to between a pair of rear vertical members 24. A front end of the cutout portion 40a is positioned on the forward side of the rear vertical member 24.

As shown in FIG. 3, a region below the platform 40 that is partitioned by the platform 40 is the engine compartment E. The engine compartment E is formed between the pair of front lateral members 21a across the forward directional directions. The front end of the engine compartment E is partitioned by a grill 41 capable of passing air in the forward-rearward directions.

<Lower Portion Cover>

As shown in FIG. 3, the lower portion cover 43 partitions the engine compartment E from the rearward thereof. That is, the lower portion cover 43 partitions the engine compartment E along with the platform 40 and the grill 41. The lower portion cover 43 extends in the vehicle width direction across the pair of rear vertical members 24, and a portion of both ends side of the lower portion cover 43 in the width direction is fixed to the rear end surface of the upper portion in these rear vertical members 24. The upper end of the lower portion cover 43 is the position in the vertical direction corresponding to the upper end of the rear vertical member 24.

The lower portion cover 43 has a shape which firstly extends downward from the upper end thereof along the rear end surface of the upper portion of the rear vertical member 24, secondly bends and extends diagonally in the forward side and downward, and then bends and extends again downward along the vertical surface. The lower end of the lower portion cover 43 is positioned above the lateral member 21. Therefore, the engine compartment E is opened rearward at the below of the lower portion cover 43. The both sides in the vehicle width direction in the lower portion of the lower portion cover 43 do not block the engine compartment E from the rearward side thereof and opens rearward the engine compartment E.

<Upper Portion Cover 42>

As shown in FIGS. 2 to 4, the upper portion cover 42 is provided at the center in the width direction in the rear portion of the platform 40. The upper portion cover 42 covers the cutout portion 40a of the platform 40 from the above thereof. The upper portion cover 42 has a shape rising above the upper surface of the platform 40. The upper portion cover 42 protrudes rearward of the rear end of the platform 40. The lower end of the rear portion of the upper portion cover 42 is connected to the upper end of the lower portion cover 43 across the vehicle width direction. A space inside the upper portion cover 42 is a pipe housing space P that communicates with the engine compartment E and bulges upward in the rear portion of the engine compartment E.

<Engine>

The engine 45 is equipped in the engine compartment E. The engine 45 is fixed to the pair of front lateral members 21a between the pair of front lateral member members 21a. Directly above the engine 45, the upper portion cover 42 and the pipe housing space P partitioned by the upper portion cover 42 are disposed.

<Air Cleaner>

The air cleaner 50 removes foreign particles, such as grit and dust, from air supplied to the engine 45. The air cleaner 50 is provided on the upper portion cover 42. That is, the air cleaner 50 is provided at a center portion in the vehicle width direction on the platform 40 via the upper portion cover 42.

The air cleaner 50 has an air cleaner main body 51 and an intake portion 52. In the air cleaner main body 51, a filter or the like is provided and is fixed to the upper surface of the upper portion cover 42. The intake portion 52 is provided in the upper portion of the air cleaner main body 51. The intake portion 52 has a disc shape and suctions air from below at an outer peripheral portion of the disc shape and introduces the air into the air cleaner main body 51.

In the present embodiment, two air cleaners 50 are provided in the vehicle width direction.

<Intake Pipe>

The intake pipe 53 is a pipe connecting the air cleaner 50 and the engine 45. The intake pipe 53 introduces air passed through the air cleaner 50 into the engine 45. The intake pipe 53 extends rearward from the air cleaner 50 and then bends downward, penetrates part of the upper portion cover 42, and extends into the engine room E through the pipe housing space P. The intake pipe 53 is bent forward in the engine room E and is connected to the engine 45.

In the present embodiment, the intake pipe 53 is connected to each air cleaner 50, in other words, two intake pipes 53 are provided in total.

<Exhaust Gas Purifying Device>

The exhaust gas purification device 55 is a post-treatment device for an exhaust gas discharged from the engine 45, and has a role to remove particulate matter (PM) in the exhaust gas. The exhaust gas purification device 55 is provided on the engine 45 in the engine room E. In the exhaust gas purification device 55, the exhaust gas from the engine 45 is introduced via a pipe (not shown). The exhaust gas purification device 55 is provided at the center in the vehicle width direction and directly below the pipe housing space P.

<Exhaust Pipe>

The exhaust pipe 56 is a pipe that guides the exhaust gas passed through the exhaust gas purification device 55 to the outside. One end of the exhaust pipe 56 which is an upstream end portion is connected to the exhaust gas purification device 55. As shown in FIG. 3, the exhaust pipe 56 extends upward from the exhaust gas purification device 55, bends after reaching the pipe housing space P, and extends diagonally rearward and downward. The exhaust pipe 56 bends at the rear portion of pipe housing space P, extends downward, and extends into the engine room E.

After that, as shown in FIG. 2, the exhaust pipe 56 extends toward the right side in the vehicle width direction in the engine room E, penetrates in the vehicle width direction the rear vertical member 24 of the right side in the vehicle width direction, and extends toward the right side in the vehicle width direction while passing through an inside portion of the rear support 27 of the right side in the vehicle width direction. The exhaust pipe 56 projects upward the rear support 27 via an opening 27a that is the upper end surface of the rear support 27. The other end of the exhaust pipe 56 which is the downstream end portion is positioned above the rear support 27.

<Cooling Unit>

The cooling unit 60 is provided in front of the engine compartment E and is provided between the engine 45 and the grill 41 so as to face the grill 41. The cooling unit 60 has a radiator. The radiator has a number of heat radiating tubes through which a cooling water of the engine 45 flows, and cools the cooling water by the air introduced into the engine room E via the grill 41. The cooling unit 60 may have an oil cooler or an after-cooler.

The cooling fan 61 is provided between the engine 45 and the cooling unit 60 in the engine room E. The cooling fan 61 is capable of driving rotatable about an axis extending in the forward-rearward directions, thereby air is blown from the forward side toward the rearward side.

The hydraulic device 62 includes a hydraulic drive system pump, an oil tank and the like, and is fixed to a transmission device (not shown) on the rearward side of the engine room E. The hydraulic device 62 is disposed in the vicinity of the center in the vehicle width direction. In front of the hydraulic device 62, the lower portion cover 43 is provided, in other words, the hydraulic device 62 is isolated from the rear upper portion of the engine room E by the lower portion cover 43.

<Fender>

A pair of fenders 70 is provided at the rearward side of engine room E at a distance in the vehicle width direction. Each fender 70 is fixed to the corresponding rear support 27 disposed at the both sides in the vehicle width direction. The fender 70 has a fender horizontal plate 71, a fender inclination plate 72, and fender lateral plate 73. The fender 70 can be constructed using, for example, steel plate.

<Fender Horizontal Plate>

The fender horizontal plate 71 extends along the horizontal surface from the rear support 27, which is the platform 40 side. The fender horizontal plate 71 has a plate shape extending along the horizontal surface in the vehicle width direction and the forward-rearward directions. The fender horizontal plate 71 has a longitudinal direction in the vehicle width direction and a short-side direction in the forward-rearward directions. In the fender horizontal plate 71, a front end extending in the vehicle width direction is fixed to the rear support 27. The fender horizontal plate 71 contacts the rear support 27 across the vehicle width direction. The end portion of fender horizontal plate 71 in the inner side in the vehicle width direction protrudes in the inner side in the vehicle width direction of the rear support 27. The protruding portion may be fixed to the rear vertical member 24 positioned in the inner side in the vehicle width direction of the rear support 27.

<Fender Inclination Plate>

A fender inclination plate 72 has a plate shape extending so as to incline downward while directing rearward from the rear end extending along the vehicle width direction in the fender horizontal plate 71. The fender inclination plate 72 extends along the rear portion of the front wheel 31. The lower end of the fender inclination plate 72 extends to a position corresponding to the upper surface of the lateral member 21. The size in the vehicle width direction in the upper portion of the fender inclination plate 72 is set to a size corresponding to the fender horizontal plate 71. As shown in FIGS. 2 and 4, the end portion inward in the vehicle width direction of the fender inclination plate 72 is retracted outward in the vehicle width direction while directing downward and rearward. As a result, the size in the vehicle width direction of the fender inclination plate 72 is set smaller as the position thereof is lower.

<Fender Lateral Plate>

A fender lateral plate 73 has a plate shape extending along the vertical surface including the forward-rearward directions and is provided along the fender horizontal plate 71 and the fender inclination plate 72 at outward the fender 70 in the vehicle width direction.

<Shield Portion>

The shield portion 80 is provided between the pair of fenders 70. Both ends of the shield portion 80 in the vehicle width direction are respectively connected to the both sides of the fender 70 in the vehicle width direction. The shield portion 80 has a shield horizontal plate 81 and a shield inclination plate 82. The shield portion 80 may be constituted using, for example, steel plate.

<Shield Horizontal Plate>

The shield horizontal plate 81 extends rearward along the horizontal surface from the rear support 27. The fender horizontal plate 71 has a longer side (longitudinal) direction in the vehicle width direction and a short side direction in the forward-rearward directions. The size of the forward-rearward directions of the shield horizontal plate 81 is set to size corresponding to the forward-rearward directions of the fender horizontal plate 71. The both ends of the shield horizontal plate 81 in the vehicle width direction are respectively in contact with the end portions inward the fender horizontal plate 71 in the vehicle width direction across the forward-rearward directions. An outer surface which is an upper surface of the shield horizontal plate 81 and an outer surface which is an upper surface of the fender horizontal plate 71 may be flush with each other. An inner surface which is a lower surface of the shield horizontal plate 81 and an inner surface which is a lower surface of the fender horizontal plate 71 may be flush with each other.

The front end extending in the vehicle width direction in the shield horizontal plate 81 faces a surface facing rearward the lower portion cover 43 across the vehicle width direction. The front end of the shield horizontal plate 81 is separated from the lower portion cover 43 with a clearance C.

<Shield Inclination Plate>

The shield inclination plate 82 has a plate shape extending so as to incline downward while directing rearward from a rear end of the shield horizontal plate 81 extending along the vehicle width direction. The shield inclination plate 82 extends from a position in the forward-rearward directions and in the vertical direction corresponding to the fender inclination plate 72 at the same inclination angle as the shield inclination angle plate 82.

In other words, the shield inclination plate 82 and the fender inclination plate 72 extend downward at the same inclination angle when viewed from the vehicle width direction.

Both ends of the shield inclination plate 82 in the vehicle width direction are respectively in contact with the end portions inward the fender inclination plate 72 in the vehicle width direction across an inclination direction. An outer surface facing rearward and upward in the shield inclination plate 82 and an outer surface facing rearward and upward the fender inclination plate 72 may be flush with each other. An inner surface of the shield inclination plate 82 facing downward and forward and an inner surface of the fender inclination plate 72 facing downward and forward may be flush with each other.

The lower end of the shield inclination plate 82 is positioned above and forward the lower end of the fender inclination plate 72. In other words, a length of the inclination surface of the shield inclination plate 82, which is the size from the rear end of the shield horizontal plate 81 in the inclination direction, is smaller than a length of the inclination surface of the fender inclination plate 72 from the rear end of the fender horizontal plate horizontal plate 71.

<Bracket>

As shown in FIG. 2, a pair of bracket 85 is provided on both sides in the vehicle width direction, and is fixed to the rear vertical member 24 or the rear support 27. The bracket 85 has a role to support the shield portion 80.

The bracket 85 on the left side in the vehicle width direction is fixed to the rear vertical member 24. The bracket 85 on the right side in the vehicle width direction is fixed to the rear support 27. On the upper surfaces of the pair of brackets 85, the portions on both sides in the vehicle width direction in the lower surface of the shielding horizontal plate 81 are placed. The shield portion 80 is fixed to the bracket 85 via a fixing member such as a bolt penetrating the shield horizontal plate 81 in the vertical direction.

The shield portion 80 is supported only by the bracket 85 and is not fixed to the other members. By supporting the shield portion 80 by the bracket 85, the clearance C is formed between a front end of the shield portion 80 and a surface facing rearward the lower portion cover 43. In other words, the shield portion 80 is not fixed to the lower cover 43. The shield portion 80 is not fixed to the fenders 70 on both sides in the vehicle width direction as well. Therefore, the shield portion 80 is independent from the fenders 70 while both ends of the shield portion 80 in the vehicle width direction are in contact with the fenders 70.

<Vessel>

As shown in FIG. 1, a vessel 90 has a vessel main body 91 and an exhaust gas introduction section 96.

<Vessel Main Body>

The vessel main body 91 is provided at a rear portion of the chassis 10. The vessel 90 has a structure capable of loading heavy objects to be transported such as crushed stones. The vessel 90 has a front surface plate 92, a bottom plate 93, a lateral plate 94, and a protector 95.

The front surface plate 92 is provided on the rear side of the fender 70 and the shielding portion 80 so as to face the fenders 70 and the shielding portion 80. The front surface plate 92 extends so as to incline forward while directing upward. The bottom plate 93 extends rearward and upward from the lower end of the front surface plate 92. The bottom plate 93 is inclined according to an inclination of the lateral members 21. A pair of lateral plates 94 is provided on both sides of the front surface plate 92 and the bottom plate 93 in the vehicle width direction. A space for loading the object to be transport is formed by the front surface plate 92, the bottom plate 93, and the pair of lateral plates 94. Flow paths are formed inside the front surface plate 92, the bottom plate 93, and the pair of lateral plates 94 in the vessel main body 91. These flow paths are connected to each other.

The protector 95 has a plate shape extending forward from an upper end of the front surface plate 92. The protector 95 covers the cab 35 from above.

The vessel main body 91 is rotatable about an axis extending in the vehicle width direction as fulcrum with respect to the frame 20 via a connection pin (not shown). An upper end of a hoist cylinder 90a is connected to a bottom plate 93 of the vessel main body 91. A lower end of the hoist cylinder 90a is connected to the lateral member 21. The hoist cylinder 90a expands and contracts by supplying hydraulic oil from the hydraulic device 62 described above. The vessel main body 91 moves up and down with respect to the frame 20 with the connecting pin as fulcrum by expanding and contracting the hoist cylinder 90a. As a result, as shown in FIG. 1, the vessel main body 91 is capable of being raised and lowered between a state in which the vessel main body 91 is seated and a state in which a front portion of the vessel main body 91 rises and the vessel main body 91 is elected from the seated state.

<Exhaust Gas Introduction Portion>

Figure 5:
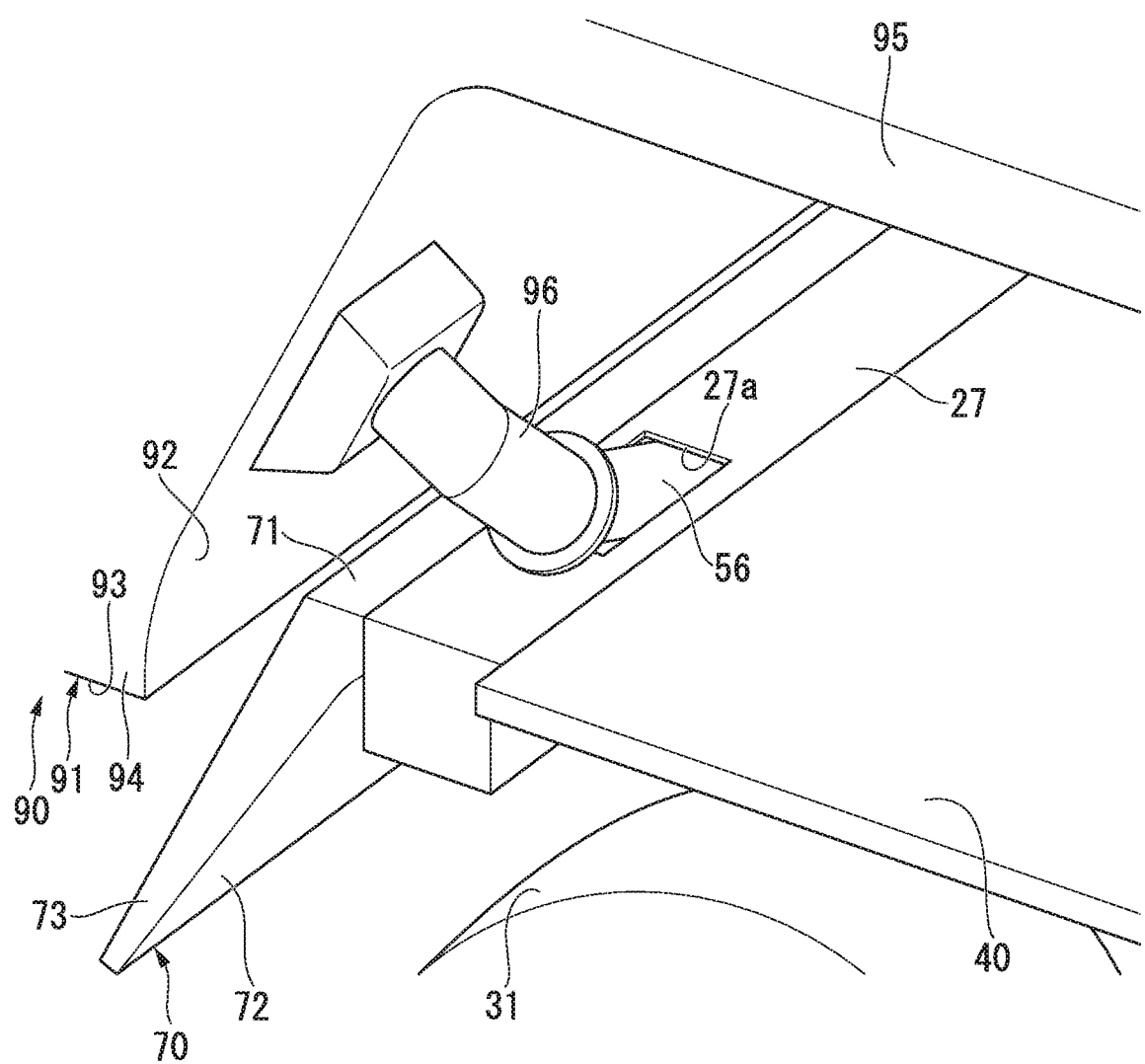
FIG. 5 is a perspective view showing an exhaust pipe of an engine and an exhaust gas introduction portion of and a vessel in the dump truck of the embodiment of the present invention.

As shown in FIGS. 1 and 5, the exhaust gas introduction portion 96 is fixed to the front surface plate 92 of the vessel main body 91. The exhaust gas introduction portion 96 has a pipe-like shape, and one end thereof is fixed to a front surface plate 92 of the vessel main body 91 so as to communicate with the flow paths in the vessel main body 91.

The exhaust gas introduction portion 96 is positioned above the fenders 70 and the shield portion 80. The exhaust gas introduction portion 96 is not connected to the exhaust pipe 56 when the vessel main body 91 is erected, and is connected to the other end of the exhaust pipe 56 only when the vessel main body 91 is seated. As a result, the exhaust gas introduction portion 96 and the exhaust pipe 56 communicate with each other only when the vessel main body 91 is seated. In addition, the exhaust gas introduction portion 96 and the exhaust pipe 56 are configured so that the inside portions thereof communicate with each other and be capable of passing through the exhaust gas by two flanges respectively provided on the exhaust gas introduction portion 96 and the exhaust pipe 56 being abutted each other when the vessel main body 91 is seated.

When the vessel main body 91 is seated, the exhaust gas from the engine 45 is supplied to the flow paths in the vessel main body 91 via the exhaust pipe 56 and the exhaust gas introduction portion 96. As the exhaust gas flows through these flow paths, the vessel main body 91 is capable of being heated. As a result, it is possible to dry deposits, such as mud, adhered on the surface of the vessel main body 91, and the deposits can be easily removed.

<Operation and Effects>

When the cooling fan 61 is driven when the dump truck 1 is operated, air is blown into the engine room E from the forward side to the rearward side thereof. The air introduced into the engine room E through the grill 41 cools the cooling unit 60, and then is supplied rearward by the cooling fan 61, thereby the engine 45 is cooled. The air heated by cooling the engine 45 is introduced into a rear of the engine room E through a lower part and a lateral part of the lower portion cover 43.

Here, when the shield portion 80 is not provided, most of the heated air introduced to the rear of the engine room E rises upward and is introduced on the platform 40. In this case, it is not preferable because the air cleaner 50 disposed on the platform 40 will take a high temperature air inside thereof. In addition, in a case where devices which are necessary to consider a heat resistance are disposed on the platform 40, the devices are exposed to high temperature, and thus it is also not preferable.

On the other hand, in the present embodiment, since the shield portion 80 extending rearward and downward from the platform 40 side is provided in the rear of the engine compartment E, it is possible to suppress a rise of air by the shield portion 80. In particular, in the present embodiment, both sides of the shield portion 80 in the vehicle width direction are connected to the fenders 70. Therefore, there is no room for air to pass upward between the shield portion 80 and the fenders 70 even on both sides in the vehicle width direction, and it is possible to further suppress an introduction of heated air on the platform 40.

Further, the air, an upward movement of which is blocked by the shield portion 80, is guided to both sides in the vehicle width direction by the shield portion 80 as indicated by a dashed line arrow in FIG. 4, and thus is guided to the fenders 70 on both sides in the vehicle width direction. In other words, the air heated by the engine 45 is possible to be guided to the inner surface of the fender 70. Since the inner surface of each fender 70 faces the corresponding front wheels 31 at the rear side of the front wheels 31, the dirt containing moisture and the like easily adheres. By guiding the heated air to the inner surface of the fender 70, it is possible to dry and easily drop the dirt. Further, even in a case where the dirt adhered on the fenders 70 is frozen in the cold district, it is possible to be melted and dropped the dirt by the heated air.

In the present embodiment, since it is possible to suppress the rise of the heated air by the shield portion 80, it is possible to dispose the air cleaner 50 directly above the position close to the engine 45. Therefore, it is possible to reduce the length of the intake pipe 53 connecting the engine 45 and the air cleaner 50.

In the present embodiment, the both ends of the shield inclination plate 82 of the shield portion 80 respectively abut on the fender inclination plates 72. Therefore, the air blocked by the inner surface of the shield inclination plate 82 is directly guided to the inner surface of the fender inclination plate 72 by flowing outward in the vehicle width direction. As a result, it is possible to effectively drop the dirt on the inner surface of the fender inclination plate 72.

In the present embodiment, the shield horizontal plate 81 is connected to the front side of the shield inclination plate 82. Due to the presence of the shield horizontal plate 81, it is possible to dispose further rearward the shield inclination plate 82. As a result, since it is possible to prevent rising of air over a wider range to the rear and since the both ends of the shield horizontal plate 81 are respectively in contact with the fender horizontal plates 71, there is no possibility of a leakage of air from between the shield horizontal plate 81 and the fender horizontal plate 71 and rising of the air.

In addition, similarly to the fender 70 having the fender horizontal plate 71 and the fender inclination plate 72, the shield portion 80 having the shield horizontal portion and the shield inclination plate 82 is formed and each of the inclination plates has the same inclination, and thereby, it is possible to unify the shape of the fender 70 and the shield portion 80 and improve the aesthetic point of view thereof. In particular, since the both ends of the shield portion 80 are connected to the fenders 70 and the fenders 70 and the shield portion 80 are continuously connected to each other, it is possible to obtain a more unified appearance and to obtain a more beautiful appearance. Furthermore, since the shield portion 80 and the fenders 70 have a similar structure, there is no large structural change between the shield portion 80 and the fenders 70. Thus, it is possible to guide more smoothly the air blocked by the shield portion 80 to the inner surface of each fender 70.

Here, in the present embodiment, the front end of the shield portion 80 is not fixed to the lower portion cover 43, and is supported by the bracket 85 in a manner such that a clearance C is formed between the front end of the shield portion 80 and the lower portion cover 43. Therefore, the shield portion 80 and the lower portion cover 43 can be prevented from being brought into contact with each other or rubbed against each other due to vibration during travel of the dump truck 1, and it is possible to improve in durability of the shield portion 80 and the lower portion cover 43.

Further, since the shield portion 80 is supported by the bracket 85, the shield portion 80 is not fixed to the fenders 70, and the shield portion 80 and the fenders 70 are independent with each other while being in contact with each other. Therefore, even in a case where heavy object such as crushed stone, which has been wound up by the front wheels 31, collides with the fender 70, it is possible to avoid an impact on the shield portion 80. In addition, since it is possible to replace the shield portion 80 as it is when the fender 70 only is to be replaced, the cost can be reduced and the replacement work of the fender 70 can be facilitated.

In the present embodiment, the exhaust gas introduction portion 96 of the vessel 90 connected to the exhaust pipe 56 is provided above the shield portion 80. As a result, the hydraulic device 62 for handling the hydraulic oil and the exhaust gas introducing portion 96 for introducing the exhaust gas into the vessel main body 91 are vertically separated from each other via the shield portion 80. Therefore, since the hydraulic oil and the high-temperature portion can be separated from each other, safety can be further ensured.

Other Embodiments

Embodiments of the present invention have been described above; however, the present invention is not limited thereto, and may be appropriately modified without departing from the spirit and scope of the present invention.

For example, the clearance C between the front end of the shield horizontal plate 81 and the lower portion cover 43 may be closed by a buffer material such as sponge, for example. As a result, while further suppressing the upward movement of the air heated by the engine 45, it is possible to avoiding a transmission of vibration between the shield portion 80 and the lower portion cover 43 without the shielding portion 80 and the lower portion cover 43 being brought into contact with each other or being rubbed against each other.

The pair of brackets 85 may be fixed to each rear vertical member 24 or may be each fixed to the rear support 27.

An example in which the engine 45 is cooled by blowing of the cooling fan 61 has been described in the embodiment; however, the cooling fan 61 is not necessarily provided. Even in a case where there is no cooling fan 61, it is possible to cool the engine 45 by air flowing from the front toward the rear around the engine 45 when the dump truck 1 is traveling. Then, the air heated by cooling the engine 45 is prevented from rising up onto the platform 40 by the shield portion 80, and is guided to the fenders 70. Therefore, operation and effects similar to that of the embodiment can be obtained.

INDUSTRIAL APPLICABILITY

According to the dump truck described above, it is possible to suppress the accumulation of dirt on the fenders while suppressing a temperature rise of the platform.

BRIEF DESCRIPTION OF THE REFERENCE SYMBOLS

1: Dump Truck
10: Chassis
20: Frame
21: Lateral member
21a: Front Lateral Member
22: Bumper
23: Front Vertical Member
24: Rear member (Vertical Member)
25: forward-rearward stay
26: Front Support
27: Rear Support (Support)
27a: Opening
31: Front Wheels (Wheels)
32: Rear Wheels
35: Cab
40: Platform
40a: Cutout Portion
41: Grill
42: Upper Portion Cover
43: Lower Portion Cover
45: Engine
50: Air Cleaner
51: Air Cleaner Main Body
52: Intake Portion
53: Intake Pipe
55: Exhaust Gas Purifying Device
56: Exhaust Pipe
60: Cooling Unit
61: Cooling Fan
62: Hydraulic Device
70: Fender
71: Fender Horizontal Plate 72: Fender Inclination Plate
73: Fender Lateral Plate
80: Shield Portion
81: Shield Horizontal Plate
82: Shield inclination Plate
85: Bracket
90: Vessel
90a: Hoist cylinder
91: Vessel Main Body
92: Front Surface Plate
93: Bottom Plate
94: Lateral Plate
95: Protector
96: Exhaust Gas Introduction Portion
E: Engine Compartment
P: Pipe Housing Space
C: Clearance

The invention claimed is:

1. A dump truck comprising:
a frame including a pair of front lateral members extending in forward-rearward directions and disposed at a distance in a vehicle width direction, and a vertical member connected to each front lateral member and extending upward;
wheels provided at a distance in the vehicle width direction and connected to the frame;
a platform supported on each vertical member and partitioning an engine compartment below;
an engine provided in the engine compartment;
a pair of fenders, each of which has a fender inclination plate extending so as to incline downward from the platform side toward a rearward side along the rear of each of the wheels; and
a shield portion having a shield inclination plate that inclines downward from the platform side toward the rearward side between the pair of the fenders, and both ends of the shield portion in the vehicle width direction are respectively connected to the fenders.

2. The dump truck according to claim 1,
wherein both ends of the shield inclination plate in the vehicle width direction are respectively in contact with the fender inclination plates.

3. The dump truck according to claim 2,
wherein the fender further includes a fender horizontal plate extending along a horizontal surface from the platform side toward the rearward side and the rear end of which is connected to the fender inclination plate,
wherein the shield portion further includes a shield horizontal plate extending along a horizontal plane from the platform side toward the rearward side and a rear end of which is connected to the shield inclination plate, and
wherein both ends of the shield horizontal plate in the vehicle width direction are respectively in contact with the fender horizontal plates.

4. The dump truck according to claim 3, further comprising:
an air cleaner that is disposed at a position in the vehicle width direction corresponding to the shield portion on the platform and that suctions air; and
an intake pipe that introduces the air that has passed through the air cleaner to the engine.

5. The dump truck according to claim 3,
wherein the frame has a support extending outward in the vehicle width direction from upper portions of the pair of the vertical members,
wherein the dump truck further comprises:
a lower portion cover that partitions the engine compartment from a rear thereof between the pair of the vertical members; and
a bracket that is fixed to both sides of the vertical member in the vehicle width direction or the support, and that supports the shield portion, and
wherein a front end of the shield portion that extends in the vehicle width direction faces the lower portion cover via a clearance.

6. The dump truck according to claim 3, further comprising:
a hydraulic device disposed below the shield portion;
a vessel having a vessel main body provided on the frame so as to be capable of being raised and lowered and an inside portion of which a flow path is formed, and an exhaust gas introduction portion provided in a front surface plate of the vessel main body and positioned above the shield portion; and
an exhaust pipe, one end of which is connected with the engine and an exhaust gas discharged from the engine is introduced, and the other end of which is connected to the exhaust gas introduction portion when the vessel main body is seated.

7. The dump truck according to claim 2, further comprising:
an air cleaner that is disposed at a position in the vehicle width direction corresponding to the shield portion on the platform and that suctions air; and
an intake pipe that introduces the air that has passed through the air cleaner to the engine.

8. The dump truck according to claim 7,
wherein the frame has a support extending outward in the vehicle width direction from upper portions of the pair of the vertical members,
wherein the dump truck further comprises:
a lower portion cover that partitions the engine compartment from a rear thereof between the pair of the vertical members; and
a bracket that is fixed to both sides of the vertical member in the vehicle width direction or the support, and that supports the shield portion, and
wherein a front end of the shield portion that extends in the vehicle width direction faces the lower portion cover via a clearance.

9. The dump truck according to claim 2,
wherein the frame has a support extending outward in the vehicle width direction from upper portions of the pair of the vertical members,
wherein the dump truck further comprises:
a lower portion cover that partitions the engine compartment from a rear thereof between the pair of the vertical members; and
a bracket that is fixed to both sides of the vertical member in the vehicle width direction or the support, and that supports the shield portion, and
wherein a front end of the shield portion that extends in the vehicle width direction faces the lower portion cover via a clearance.

10. The dump truck according to claim 2, further comprising:
a hydraulic device disposed below the shield portion;
a vessel having a vessel main body provided on the frame so as to be capable of being raised and lowered and an inside portion of which a flow path is formed, and an exhaust gas introduction portion provided in a front surface plate of the vessel main body and positioned above the shield portion; and an exhaust pipe, one end of which is connected with the engine and an exhaust gas discharged from the engine is introduced, and the other end of which is connected to the exhaust gas introduction portion when the vessel main body is seated.

11. The dump truck according to claim 1,
wherein the fender further includes a fender horizontal plate extending along a horizontal surface from the platform side toward the rearward side and the rear end of which is connected to the fender inclination plate,
wherein the shield portion further includes a shield horizontal plate extending along a horizontal plane from the platform side toward the rearward side and a rear end of which is connected to the shield inclination plate, and
wherein both ends of the shield horizontal plate in the vehicle width direction are respectively in contact with the fender horizontal plates.

12. The dump truck according to claim 11, further comprising:
an air cleaner that is disposed at a position in the vehicle width direction corresponding to the shield portion on the platform and that suctions air; and
an intake pipe that introduces the air that has passed through the air cleaner to the engine.

13. The dump truck according to claim 11,
wherein the frame has a support extending outward in the vehicle width direction from upper portions of the pair of the vertical members,
wherein the dump truck further comprises:
a lower portion cover that partitions the engine compartment from a rear thereof between the pair of the vertical members; and
a bracket that is fixed to both sides of the vertical member in the vehicle width direction or the support, and that supports the shield portion, and
wherein a front end of the shield portion that extends in the vehicle width direction faces the lower portion cover via a clearance.

14. The dump truck according to claim 11, further comprising:
a hydraulic device disposed below the shield portion;
a vessel having a vessel main body provided on the frame so as to be capable of being raised and lowered and an inside portion of which a flow path is formed, and an exhaust gas introduction portion provided in a front surface plate of the vessel main body and positioned above the shield portion; and
an exhaust pipe, one end of which is connected with the engine and an exhaust gas discharged from the engine is introduced, and the other end of which is connected to the exhaust gas introduction portion when the vessel main body is seated.

15. The dump truck according to claim 1, further comprising:
an air cleaner that is disposed at a position in the vehicle width direction corresponding to the shield portion on the platform and that suctions air; and
an intake pipe that introduces the air that has passed through the air cleaner to the engine.

16. The dump truck according to claim 15,
wherein the frame has a support extending outward in the vehicle width direction from upper portions of the pair of the vertical members,
wherein the dump truck further comprises:
a lower portion cover that partitions the engine compartment from a rear thereof between the pair of the vertical members; and
a bracket that is fixed to both sides of the vertical member in the vehicle width direction or the support, and that supports the shield portion, and
wherein a front end of the shield portion that extends in the vehicle width direction faces the lower portion cover via a clearance.

17. The dump truck according to claim 15, further comprising:
a hydraulic device disposed below the shield portion;
a vessel having a vessel main body provided on the frame so as to be capable of being raised and lowered and an inside portion of which a flow path is formed, and an exhaust gas introduction portion provided in a front surface plate of the vessel main body and positioned above the shield portion; and
an exhaust pipe, one end of which is connected with the engine and an exhaust gas discharged from the engine is introduced, and the other end of which is connected to the exhaust gas introduction portion when the vessel main body is seated.

18. The dump truck according to claim 1,
wherein the frame has a support extending outward in the vehicle width direction from upper portions of the pair of the vertical members,
wherein the dump truck further comprises:
a lower portion cover that partitions the engine compartment from a rear thereof between the pair of the vertical members; and
a bracket that is fixed to both sides of the vertical member in the vehicle width direction or the support, and that supports the shield portion, and
wherein a front end of the shield portion that extends in the vehicle width direction faces the lower portion cover via a clearance.

19. The dump truck according to claim 18, further comprising:
a hydraulic device disposed below the shield portion;
a vessel having a vessel main body provided on the frame so as to be capable of being raised and lowered and an inside portion of which a flow path is formed, and an exhaust gas introduction portion provided in a front surface plate of the vessel main body and positioned above the shield portion; and
an exhaust pipe, one end of which is connected with the engine and an exhaust gas discharged from the engine is introduced, and the other end of which is connected to the exhaust gas introduction portion when the vessel main body is seated.

20. The dump truck according to claim 1, further comprising:
a hydraulic device disposed below the shield portion;
a vessel having a vessel main body provided on the frame so as to be capable of being raised and lowered and an inside portion of which a flow path is formed, and an exhaust gas introduction portion provided in a front surface plate of the vessel main body and positioned above the shield portion; and
an exhaust pipe, one end of which is connected with the engine and an exhaust gas discharged from the engine is introduced, and the other end of which is connected to the exhaust gas introduction portion when the vessel main body is seated.

* * * * *